United States Patent [19]

Dahl

[11] Patent Number: 5,082,229
[45] Date of Patent: Jan. 21, 1992

[54] HOLDER FOR RCS, SCHEDULE GUIDE, AND MAGAZINE EMPLOYS TRANSPARENT RIGID SHEETS AND TEMPORARY FASTENERS

[76] Inventor: Robert M. Dahl, 108-A Castle Rock Rd., Walnut Creek, Calif. 94598

[21] Appl. No.: 547,865

[22] Filed: Jul. 2, 1990

[51] Int. Cl.$^5$ .............................................. A47F 5/00
[52] U.S. Cl. ................... 248/444.1; 248/453; 248/205.2
[58] Field of Search ............. 248/444.1, 445, 453, 248/459, 676, 678, 205.2

[56] References Cited

U.S. PATENT DOCUMENTS

| | | | |
|---|---|---|---|
| 3,086,658 | 4/1963 | Palmer | 248/444.1 X |
| 3,809,352 | 5/1974 | Mathias | 248/444.1 |
| 3,952,989 | 4/1976 | Hatcher | 248/453 |
| 4,326,691 | 4/1982 | Lloyd | 248/444.1 X |
| 4,492,390 | 1/1985 | Jacobs et al. | 281/31 |
| 4,559,727 | 12/1985 | Lewyt | 40/10 |
| 4,610,054 | 9/1986 | Malian | 248/205.2 X |
| 4,656,764 | 4/1987 | Feugler | 40/122 |
| 4,660,310 | 4/1987 | Farmer | 40/607 |
| 4,660,792 | 4/1987 | Rogalski | 248/174 |
| 4,681,291 | 7/1987 | Holladay | 248/444.1 |
| 4,712,693 | 12/1987 | Striplin | 248/205.2 X |
| 4,739,960 | 4/1988 | Adler | 248/453 |
| 4,815,683 | 7/1989 | Ferrante | 248/205 |
| 4,852,746 | 8/1989 | Wells et al. | 248/205.2 X |
| 4,877,212 | 10/1989 | Kobayashi | 248/444.1 |
| 4,879,759 | 11/1989 | Matsumoto et al. | 455/348 |
| 4,911,389 | 3/1990 | Self | 248/205.2 X |

FOREIGN PATENT DOCUMENTS 2151389 7/1985 United Kingdom ............. 248/444.1

OTHER PUBLICATIONS

Popular Science Magazine, Jul. 1988, p. 91, Manufacturer: Video Link Corp., Sylmar, Calif. 91342.

*Primary Examiner*—Karen J. Chotkowski

[57] ABSTRACT

A display holder constructed of transparent plastic formed with an 180° bend (12) so that its face side (11) presses against its reverse side (13). The pressure of the two sides will hold a sheet of paper printed with advertising that pertains to a consumer's electronic home entertainment center. At the opposite end, another longer-radius 180° bend (16) is made, forming a book or magazine pocket and clamp (17). This pocket and clamp (17) can then hold a book or magazine that is used in conjunction with an electonic home entertainment center. Hook-and-loop strips (14 and 15) are fastened to the display holder adjacent and parallel to the 180° bend (12). Then mating hook-and-loop strips (24 and 25) are fastened by the consumer to a plurality of electronic remote control units so that these strips (24 and 25) will mate together with the other strips (14 and 15). This allows a homeowner to fasten remote control units to the display holder, thus consolidating them for ease of use.

20 Claims, 2 Drawing Sheets

HOLDER FOR RCS, SCHEDULE GUIDE, AND MAGAZINE EMPLOYS TRANSPARENT RIGID SHEETS AND TEMPORARY FASTENERS

BACKGROUND

1. Field of Invention

This invention relates to an accessory device for use with a television or other electronic device, particularly to a device for displaying printed information and holding a television program magazine, or guide book, and remote control devices.

2. Description of Prior Art

Most cable T.V. companies provide a great many channels for their subscribers. Oftentimes the channel number to which the cable channel selector box must be tuned differs from the number of the broadcast channel which the viewer wishes to see. For this reason cable T.V. companies generally print and distribute a chart, or guide, of the broadcast channels available and their corresponding cable channel numbers.

Viewers usually keep a copy of the channel guide chart near a seating area in front of their home electronic entertainment center (television, VCR, radio, phono., CD player, tape deck, etc.). A television program magazine is usually also located somewhere in this room. Also in this room one will usually find a variety of remote control devices, e.g. for the TV, VCR, audio receiver, etc. Quite often the bedroom is also used as a television viewing room. The same viewing and listening tools, i.e., a channel guide, a television program guide, and remote control units, are also found in the bedroom.

Heretofore there has been no satisfactory means of organizing all of a homeowner's viewing and listening tools into one compact device.

There is an electronic device available that will hold three of four remote control units in one container. The container has a built in infrared light amplifier that transmits infrared light from the remote control units to any part of the room. However, this device is expensive and has no means of displaying printed material, nor does it have any way to hold and display a television program magazine or guide book.

There are numerous types of transparent plastic display containers available. Most of these are used to display a printed advertising sheet in a retail establishment. None of these containers have been designed to be used in the home for electronic entertainment, nor have they been designed to organize remote control units. Moreover they cannot hold and display magazines or books. Also they do not provide any illumination to aid in reading the printed matter. Most users of electronic entertainment equipment would therefore find it desirable to have a device that would organize their entertainment tools into one compact unit.

OBJECTS AND ADVANTAGES

Accordingly, I claim the following as my objects and advantages of this invention: to provide a device for holding and displaying a cable T.V. channel guide chart, to provide a device that will clamp nd hold a television program magazine or book, and to provide a device that will organize and hold electronic remote control devices.

In additonal claim the following additional objects and advantages: to provide a transparent panel that will display advertising on the face and back of a printed sheet of paper, to provide a means of attaching other equipment such as a battery-powered reading lamp, and to provide a compact device which will organize and consolidate all of the foregoing.

Readers will find further objects and advantages of the invention from a consideration of the ensuing description and the accompanying drawings.

DRAWING FIGURES

DRAWING REFERENCE NUMERALS

11—Face side—clear plastic panel
12—180° bend—short radius
13—Reverse side—clear plastic panel
14—Top edge hook-and-loop fastening strip
15—Lower hook-and-Loop fastening strip
16—200° bend—longer radius
17—Book or magazine clamp
18—Ski tip bend, long radius, short arc
19—Electronic remote control device
20—Magazine
21—Face side—clear plastic panel with 90° bottom bend
22—Top end
23—Bottom end
24—Top edge mating hook-and-loop fastening strip
25—Lower mating hook-and-loop fastening strip
26—Single sheet of paper, printed face and reverse
28—90° short radius bend—clear plastic panel
29—Hinges, spring loaded, clear plastic
30—Book page clamp, clear plastic
31—Book base
32—Reading lamp
33—Book

DESCRIPTION—DISPLAY HOLDER—LUXURY VERSION—FIG. 1

Figure 1:
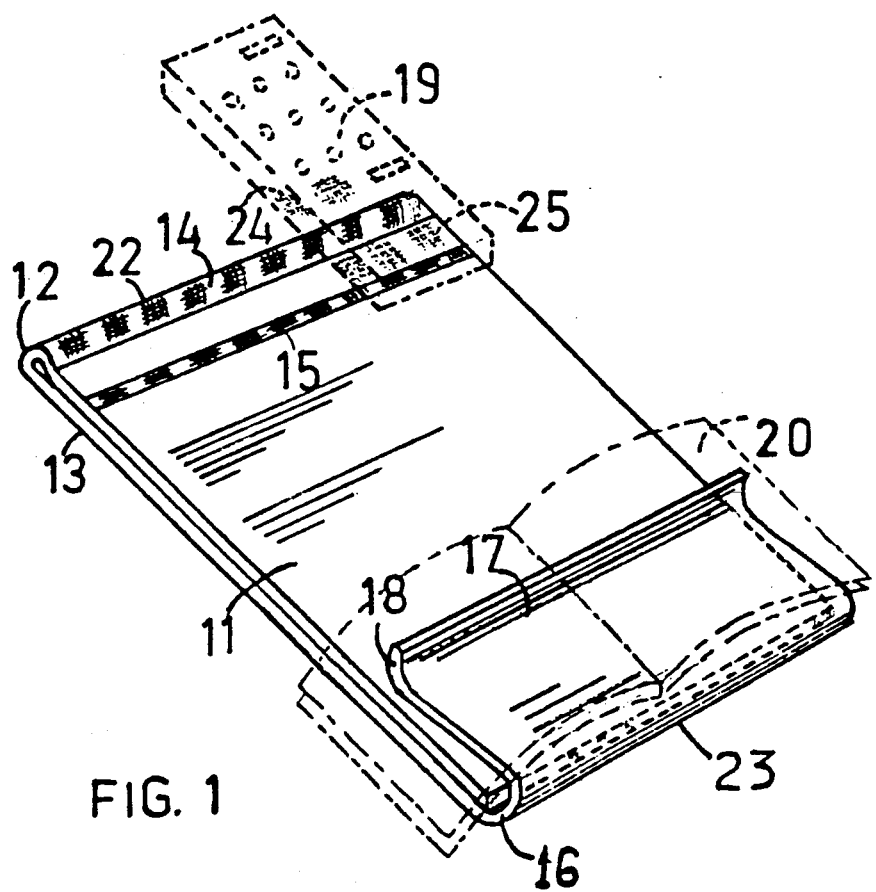
FIG. 1 shows a top perspective view of a printed matter display and holder for magazines and remote control devices in accordance with a preferred embodiment of my invention.

FIG. 1 shows a clear plastic display holder according to a preferred and "luxury" embodiment of my invention. This luxury version differs from the economy model in that it includes a clamp designed to hold and display a magazine. The holder of FIG. 1, of clear plastic, will hold a printed sheet showing a cable T.V. channel guide, along with commercial advertising of a complementary nature. The holder is made of a single piece of clear acrylic plastic, about 3.2 mm. in thickness and 216 mm. wide. Its length can vary, depending upon the desired amount of printing on a sheet of paper that will be inserted between the holder's face side 11 and its reverse side 13. Preferably it is approximately 87 cm. long so that it can hold a legal size sheet of paper.

The holder has been fashioned into its final shape by bending along three different lines. The holder's first bend 12 is a short-radius, 180° bend which, assuming the starting blank is 87 cm. long, is made about 36.2 cm. from one end. After bend 12 has been made, the two sides of the holder, face side 11 and reverse side 13, will press against each other with a clamping pressure. Reverse side 13 will be approximately 14 cm. longer than face side 11 at this point in the forming process.

A second, "ski-tip", curved bend 18 is located within the last 5 cm. of the extended or overlapping portion of reverse side 13. Bend 18 has a long radius, but has only a short arc, and is made in the direction opposite to first bend 12. After bend 18 is made, the end of the holder has a bent ski-tip shape as shown.

A third bend 16 is made in the same direction as first bend 12 so as to produce a section 17 which is folded partly over top surface 11 as indicated. However, third bend 16 has a longer radius so as to produce a gap, or pocket, of approximately 13 mm. to 38 mm. at the center point of the radius. Third bend 16 goes beyond 180° to approximately 190° or 200°. This results in a pocket that will hold a book or a magazine and provides a clear clamping section 17 which will press against a book or magazine when inserted, thereby holding it in place.

At top end 22, a 2 cm. wide strip of one side (e.g., the "hooks") of a hook-and-loop fastener pair, such as those sold under the trademarks VELCRO and LATCHLOCK, is fastened to the top of the curved portion of the holder so that hooks strip 14 is adjacent to bend 12, and runs from the left edge to the right edge of the holder. Approximately 50 mm. from the top edge strip 14, another hook strip 15 is fastened in a position parallel to strip 14.

Strips 14 and 15 can alternately be loops strips. However, both strips should be of the same type.

A pair of mating, fastening strips 24 and 25 are provided and will be attached, by the consumer, to the bottom side of their own electronic remote control (RC) units, such as unit 19. Strips 24 and 25 can be attached to the RC units by adhesive (not shown). Fastening strips 24 and 25 on the bottom side of the RC units may be placed in any location, as long as the distance between the two strips 24 and 25 matches the distance between strips 14 and 15. Approximately three remote control units can be attached firmly to face side 11.

OPERATION—DISPLAY HOLDER—LUXURY VERSION—FIG. 1

In certain areas, cable T.V. companies supply a printed sheet which shows both the channel guide and commercial advertising for the local cable T.V. company. In addition, the lower third of the sheet may contain advertising for a television schedule magazine. The reverse side of the sheet may have advertising, such as a pizza menu and a listing of phone numbers of a local pizza franchisee. Face side 11 is separated from reverse side 13 and then printed paper sheet 26 is inserted in the space between face side 11 and reverse side 13.

The consumer can now consolidate RC units, such as 19, by fastening each to the top portion of face side 11 of the display holder. When the RC units are correctly fastened to the top end, the RC units themselves are cantilevered a considerable distance beyond the display holder. Yet the hook-and-loop strips provide a very secure fastening for the RC units. A television schedule magazine can be placed between surface 11 and section 17 at the lower portion of the display holder. The magazine can be opened and placed under section 17 so that the programs for a specified day are visible through section 17, as indicated. Pages are easily turned by pulling magazine 20 out of the pocket for page turning, then sliding the magazine back into the pocket.

As cable channels change with time, new printed sheets with new commercial advertising are mailed to the cable T.V. subscriber on a continuing basis. The older printed sheet of paper can easily be removed by separating face side 11 from reverse side 13, sliding out the older sheet, and inserting the new printed sheet.

The RC units are easily removed for battery changing by pulling and separating the mating surfaces of strips 14 and 15 from strips 24 and 25.

In order to control electronic entertainment devices, it is only necessary to aim the display holder with its attached RC units in the general direction of the entertainment device and press the correct control button. It is not necessary to remove the RC unit from the display holder.

DESCRIPTION/OPERATION—DISPLAY HOLDER—ECONOMY VERSION—FIG. 2

Figure 2:
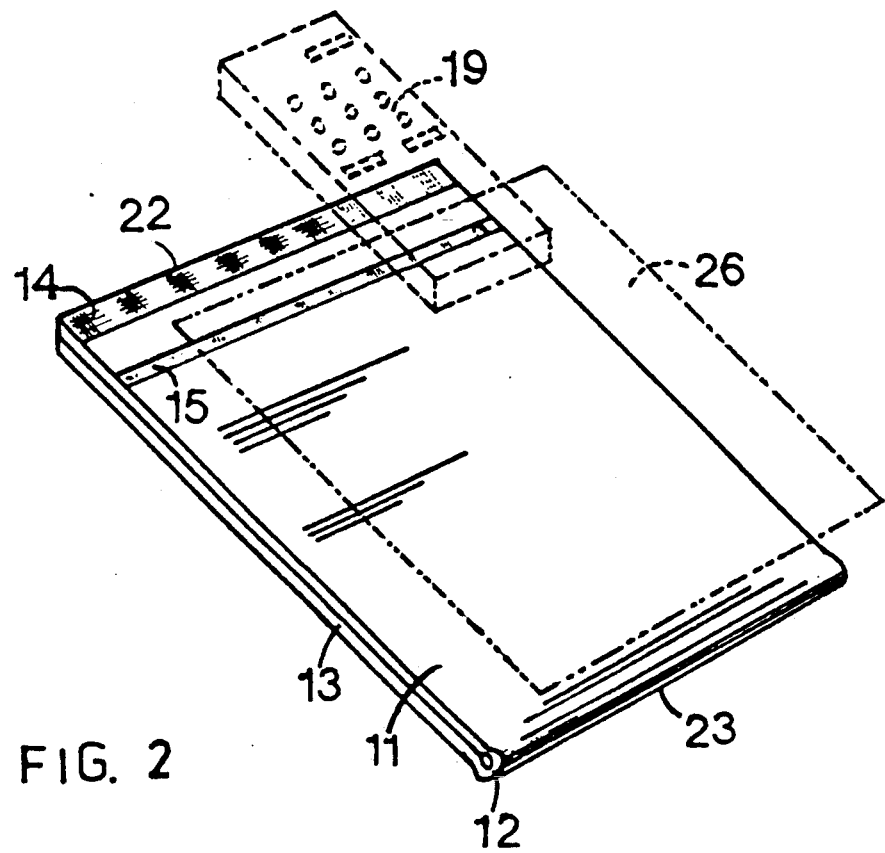
FIG. 2 shows a top perspective view of an economical version of such holder; this view illustrates its ability to attach electronic devices.

FIG. 2 shows an economy version of the display holder of FIG. 1. The economy version does not have a pocket clamp for holding a book or magazine. This version will be very inexpensive to manufacture and ship and can be used by industry as a giveaway item to introduce new products or services.

The display holder in FIG. 2 is made of a single piece of clear acrylic plastic, about 3.2 mm. in thickness. The width can vary, but a 216 mm. width is most desirable because it is the width of a standard, letter-size sheet of paper. As before, the length of the holder can vary, depending on the desired length of printing that will appear on the sheet of paper that is to be inserted between face side 11 and reverse side 13. This display holder will have one short-radius, 180° bend 12. This will result in face side 11 pressing against reverse side 13 as before, so that a sheet of paper 26 can be held and clamped there.

The top edge, or "hook" fastening strip 14, 216 mm. in length, can then be fastened adjacent to bend 12, or it can be fastened at the opposite end as indicated in FIG. 2, depending on the desires of the consumer. As before, lower hook fastening strip 15 will be spaced approximately 50 mm. from the top edge hook strip 14.

The consumer will be furnished with two mating loop strips 24 and 25, 216 mm. long. The consumer will then fasten these to electronic RC units, so that these strips will mate with strips 14 and 15.

CLEAR PLASTIC DISPLAY HOLDER—BOOK VERSION—FIG. 3

Figure 3:
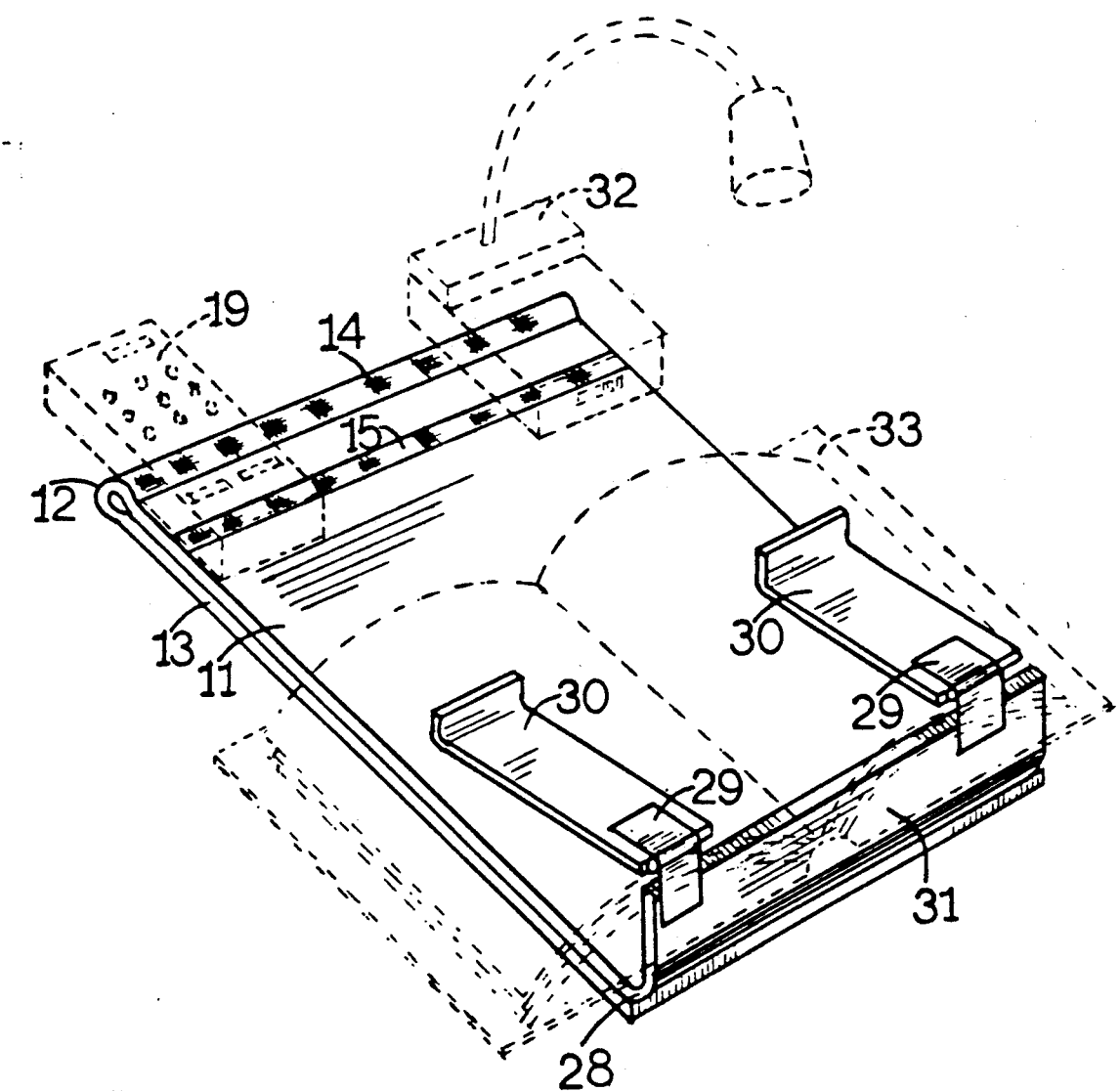
FIG. 3 shows a top perspective view of a clear plastic display holder that is also configured to hold electronic devices, as well as a book for reading in bed, in accordance with another embodiment of my invention.

FIG. 3 shows a clear plastic display holder with all of the features of the luxury version shown in FIG. 1, except for the magazine clamp at the bottom. In addition it has the capability to hold a full-size, hardcover or paperback book. This version has a 90° bend 28 at the bottom of its face side 21, thus forming a base 31 designed to support a book 33. The pages of the book are held open with two book clamps 30. Book clamps 30 are constructed of two pieces of acrylic plastic 3.2 mm. in thickness by 45 mm. wide by 90 mm. long. Clamps 30 are held in place by two spring-loaded acrylic hinges 29 fastened to book base 31. Thus left side clamp 30 and right side clamp 30 can each accommodate from one to 400 book pages. Book pages are easily turned by raising right clamp 30, then turning one book page and slipping it under left clamp 30.

This version of the clear plastic display holder is most likely to have its greatest use in the bedroom where it can facilitate reading a book in bed. A reading lamp accessory 32 can easily be attached, by means of hook-and-loop fastening strips, to the top end of the holder. This allows one to read a book in bed without bothering another person in the bedroom. At the same time a remote control unit 19 may also be fastened to the top of the holder by means of hook-and-loop fastening strips, thus allowing control of electronic entertainment equipment in the bedroom.

Conclusion, Ramifications and Scope

The reader will see that my holder has three distinct features:

a. It can conviently display the printed channel guide that most cable T.V. companies issue to their subscribers. Also there is additional advertising space that can be sold to companies that furnish complementary products and services for T.V. viewer.

b. It can conviently hold and display a book or magazine, such as a television schedule magazine.

c. It can consolidate and hold electronic RC units that are used in conjunction with electronic home entertainment systems.

Reader can see that this clear plastic display holder fulfills a need that is present in nearly all homes today. In addition, this device is very inexpensive to manufacture and ship. Thus many companies that provide products and services that complement the electronic home entertainment field will find it useful to give away this invention in order to promote their own products or services.

While the foregoing description contains many specifities, these should not be construed as limitations on the scope of the invention, but rather as an exemplification of one preferred embodiment thereof.

Many other variations are possible. For example:

a. The plastic that is used in this device may be clear transparent or color-tinted transparent to blend with other room colors.

b. Finger slots may be cut in the holder to facilitate the installation of a printed sheet of paper between the face and reverse panels.

c. The width, length, and thickness of the holders are not physically limited to any particular size. However, the 210 mm. width of a standard letter-size sheet of paper is preferred.

d. It is possible to have curves and cut out portions on the display holder and the magazine or book clamp, thus weakening the clamping pressure against a book or magazine.

e. The hook-and-loop fastening strips can be of any color desired. Two strips per holder are preferred, but only one strip is necessary. The standard length of the hook-and-loop strip will be 216 mm. The width of the strip can be any stock size desired. It is even possible to have circular or odd shaped patches of hook-and-loop strips.

f. The hook-and-loop strips can be replaced with single or multiple, magnetic and ferrous metal strip combinations.

g. If a consumer prefers, it is possible to have an extended leg or support under the top end of the holder. This will raise the aim of the RC units when the holder is placed upon a tabletop.

h. It is possible to construct the holder of glass rather than plastic, at a somewhat higher cost of manufacture.

i. It is not necessary that the bottom or reverse side of the display holder be transparent material if advertising space on the reverse side is not desired.

j. It is possible to construct the display holder using a longer plastic sheet incorporating a bend that will act as a floor stand, and will support the display holder over a cocktail table or over the arm rest at the side of a seating device such as a chair or couch.

Accordingly, the full scope of the invention should be determined by the appended claims and their legal equivalents and not by the examples given.

I claim:

1. A portable, hand-held or tabletop display and consolidating device, comprising:
    means for holding and displaying a printed sheet, said means comprising a pair of rigid sheets, one of said sheets being an upper sheet and the other being a lower sheet,
    said rigid sheets being of substantially equal size,
    means for positioning said rigid sheets in a parallel, face-to-face relationship so as to securely, yet removably sandwich said printed sheet between said rigid sheets,
    at least said upper rigid sheet being transparent so that said printed sheet can be read through said upper rigid sheet,
    means for fastening a plurality of portable, hand-holdable electrical devices to said upper rigid sheet, such that any of said devices can be easily and repeatedly attached and detached from said upper sheet, thereby consolidating and organizing said devices and said printed sheet, allowing said devices and said printed sheet to be used and read without removal, and allowing any of said devices and said sheet to be replaced easily.

2. The device of claim 1 wherein said means for fastening comprises a pair of hook-and-loop strips.

3. The device of claim 1, further including means for holding and displaying a magazine or small book, said means comprising a sheet bent so as to press said magazine or book against one sheet of said pair of rigid sheets.

4. The device of claim 3 wherein said means for fastening comprises a pair of hook-and-loop strips.

5. The device of claim 3 wherein one part of said hook-andloop strips are permanently fastened to the face of said one sheet.

6. The device of claim 3 wherein one of said sheets of rigid material includes a second bend that forms a ski-tip shape at one end thereof, and further including a third bend that forms a pocket for holding said magazine or book.

7. The device of claim 1 wherein one part of said hook-and-loop strips are permanently fastened to the face of said one sheet.

8. The device of claim 1, further including said plurality of portable hand-held devices, one part of said hook-and-loop strips being permanently fastened to a back surface of said portable hand-held devices.

9. The device of claim 1 wherein one of said sheets is formed into a 90° bend to form a book support base, and further including a pair of spring-loaded, transparent hinges fastened to said one sheet.

10. The device of claim 9, further including a pair of transparent plastic hold-down pieces fastened to said transparent hinges, respectively.

11. The device of claim 10 wherein said pair of plastic holddown pieces have first and second ends, said pieces containing a single bend formed into a ski-tip shape at said first end, said second end fastened to said transparent hinges.

12. A holder for holding and displaying electrical accessories and a schedule guide, comprising:
a transparent sheet of rigid material,
means for holding a sheet of paper comprising a schedule guide against one side of said transparent sheet, said means comprising a second sheet of rigid material and means for holding said second sheet against the opposite side of said transparent sheet,
means for enabling a plurality of portable electrical devices to be attached to said opposite side of said transparent sheet, and
means for holding and displaying a book or magazine against said opposite side of said transparent sheet.

13. The holder of claim 12 wherein said means for holding said second sheet comprises an integral bend, and said means for enabling comprises a hook-and-loop fastener.

14. The holder of claim 13 wherein said means for holding said second sheet comprises a tight bend in said transparent sheet which attaches said second sheet to said transparent sheet.

15. The holder of claim 13 wherein said transparent sheet of rigid material is comprised of a plastic material, and said rigid material is of a size to completely enclose a sheet of paper of a predetermined size and to partially cover said magazine or book.

16. The holder of claim 15 wherein said transparent sheet of rigid material includes a second bend that forms a ski-tip shape at one end, and further including a third bend that forms a pocket for holding said magazine or book.

17. A holder for remote-control units and accompanying printed material, comprising:
a pair of rigid, flat sheets, one being an upper sheet and the other being a lower sheet having substantially equal size and, each of said sheets having upper and lower major surfaces which are parallel and which face in opposite directions,
said upper sheet being transparent so that a sheet of printed material placed between said two sheets can be read through said upper sheet,
means holding said two sheets together so that said lower surface of said upper sheet faces said upper surface of said lower sheet, and
means on said upper surface of said upper sheet for removably holding a plurality of electronic remote control units thereon.

18. The holder of claim 17 wherein said means holding said two sheets together is an integral bend at one end of said sheets.

19. The holder of claim 17, further including book-holding means positioned at one end of and above said upper sheet.

20. The holder of claim 19 wherein said book-holding means comprises an extension of one end of said lower sheet which curves around the corresponding end of said upper sheet and extends partially over said upper surface of said upper sheet.

* * * * *